United States Patent
Wang et al.

(10) Patent No.: US 10,293,810 B2
(45) Date of Patent: May 21, 2019

(54) HYBRID VEHICLE IDLE AND CREEP CONTROL

(71) Applicant: Ford Global Technologies, LLC, Dearborn, MI (US)

(72) Inventors: Xiaoyong Wang, Novi, MI (US); Mark Steven Yamazaki, Canton, MI (US); Wei Liang, Farmington Hills, MI (US); Rajit Johri, Ann Arbor, MI (US); Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1248 days.

(21) Appl. No.: 14/057,618

(22) Filed: Oct. 18, 2013

(65) Prior Publication Data

US 2015/0111693 A1  Apr. 23, 2015

(51) Int. Cl.
*B60W 10/08* (2006.01)
*B60W 20/40* (2016.01)
(Continued)

(52) U.S. Cl.
CPC .............. *B60W 20/40* (2013.01); *B60K 6/48* (2013.01); *B60W 10/02* (2013.01); *B60W 10/06* (2013.01);
(Continued)

(58) Field of Classification Search
CPC .......... Y10S 903/902; F16H 2048/205; B60W 10/08
See application file for complete search history.

(56) References Cited

U.S. PATENT DOCUMENTS 7,909,730 B2  3/2011  Schwarz et al.
8,315,752 B2  11/2012  Kwon et al.
(Continued)

FOREIGN PATENT DOCUMENTS

CN  101454171 A  6/2009
CN  101646884 A  2/2010
(Continued)

OTHER PUBLICATIONS

Machine translation of KR20050098681.*
Definition of Torque Converter, retrieved from www.collinsdictionary.com on Aug. 31, 2017.*

*Primary Examiner* — Stacey A Fluhart
(74) *Attorney, Agent, or Firm* — David B. Kelley; Brooks Kushman P.C.

(57) ABSTRACT

A vehicle includes an engine having a crankshaft, a transmission having an input, and a torque converter mechanically coupled to the input. The vehicle further includes an electric machine mechanically coupled to the torque converter, a clutch configured to mechanically couple the electric machine and crankshaft, and one or more controllers. The one or more controllers are programmed to, in response to the transmission being in a drive or reverse gear and a speed of the vehicle being less than a predetermined value in an absence of driver demand, control the electric machine to achieve a target speed to cause the torque converter to output torque such that the speed of the vehicle approaches a generally constant speed less than or equal to the predetermined value when the vehicle is on a generally flat grade.

12 Claims, 3 Drawing Sheets

(51) Int. Cl.
*B60W 10/02* (2006.01)
*B60W 10/06* (2006.01)
*B60W 10/10* (2012.01)
*B60K 6/48* (2007.10)
*B60W 20/00* (2016.01)
*B60W 30/18* (2012.01)
*B60W 20/50* (2016.01)

(52) U.S. Cl.
CPC ............ *B60W 10/08* (2013.01); *B60W 10/10* (2013.01); *B60W 20/00* (2013.01); *B60W 20/50* (2013.01); *B60W 30/18063* (2013.01); *B60W 2510/1005* (2013.01); *B60W 2540/10* (2013.01); *B60W 2540/16* (2013.01); *B60W 2710/081* (2013.01); *B60W 2720/10* (2013.01); *B60Y 2300/143* (2013.01); *B60Y 2400/426* (2013.01); *Y02T 10/6221* (2013.01); *Y10S 903/902* (2013.01); *Y10T 477/26* (2015.01)

(56) References Cited

U.S. PATENT DOCUMENTS

| | | | |
|---|---|---|---|
| 8,911,324 B2* | 12/2014 | Yamazaki | B60W 10/06 180/65.28 |
| 2007/0191181 A1 | 8/2007 | Burns | |
| 2011/0118915 A1* | 5/2011 | Ortmann | B60K 6/48 701/22 |
| 2013/0296119 A1* | 11/2013 | Reed | B60W 10/02 477/5 |
| 2013/0296123 A1* | 11/2013 | Doering | B60W 10/02 477/5 |

FOREIGN PATENT DOCUMENTS

| | | | |
|---|---|---|---|
| CN | 102529947 A | 7/2012 | |
| KR | 1020050098681 | * 12/2005 | Y02T 10/6221 |

* cited by examiner

HYBRID VEHICLE IDLE AND CREEP CONTROL

TECHNICAL FIELD

This disclosure relates to systems and methods of controlling vehicle creep in a hybrid vehicle.

BACKGROUND

Hybrid electric vehicles (HEV) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or in other cases such as when the battery state of charge (SOC) drops below a certain level, the engine must start quickly and smoothly in a manner that is nearly transparent to the driver.

Vehicle creep can occur in vehicles including an engine and an automatic transmission. A vehicle creeps when the transmission is in forward or reverse gear, and the driver is not pressing the accelerator pedal. The vehicle moves in forward or reverse direction at a low speed. The driver might apply the brake pedal to slow down the creep speed or completely stop the vehicle. For a conventional powertrain, creep might be realized by controlling the engine speed while the torque converter is slipping. For the hybrid powertrain described above, creep can be realized using a different method, which is the subject of this disclosure.

SUMMARY

A vehicle includes an engine having a crankshaft, a transmission having an input, and a torque converter mechanically coupled to the input. The vehicle further includes an electric machine mechanically coupled to the torque converter, a clutch configured to mechanically couple the electric machine and crankshaft, and one or more controllers. The one or more controllers are programmed to, in response to the transmission being in a drive or reverse gear and a speed of the vehicle being less than a predetermined value in an absence of driver demand, control the electric machine to achieve a target speed to cause the torque converter to output torque such that the speed of the vehicle approaches a generally constant speed less than or equal to the predetermined value when the vehicle is on a generally flat grade.

A vehicle creep-coast control method is enabled when a transmission is in a drive gear and vehicle speed is less than a predetermined value in an absence of driver demand. The vehicle creep-coast control method operates an electric machine to achieve a target speed to cause the torque converter to output torque such that the speed of the vehicle approaches a generally constant speed less than or equal to the predetermined value when the vehicle is on a generally flat grade.

A hybrid vehicle includes an engine having a crankshaft, a transmission including an oil pump and having an input, and a torque converter mechanically coupled to the input. The vehicle further includes an electric machine mechanically coupled to the torque converter, a clutch configured to mechanically couple the electric machine and engine crankshaft, and at least one controller. The at least one controller is programmed to, in response to the transmission being in a neutral or park gear and the engine not running, control the electric machine to achieve a target speed to output torque to the oil pump for control of oil pressure in the transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
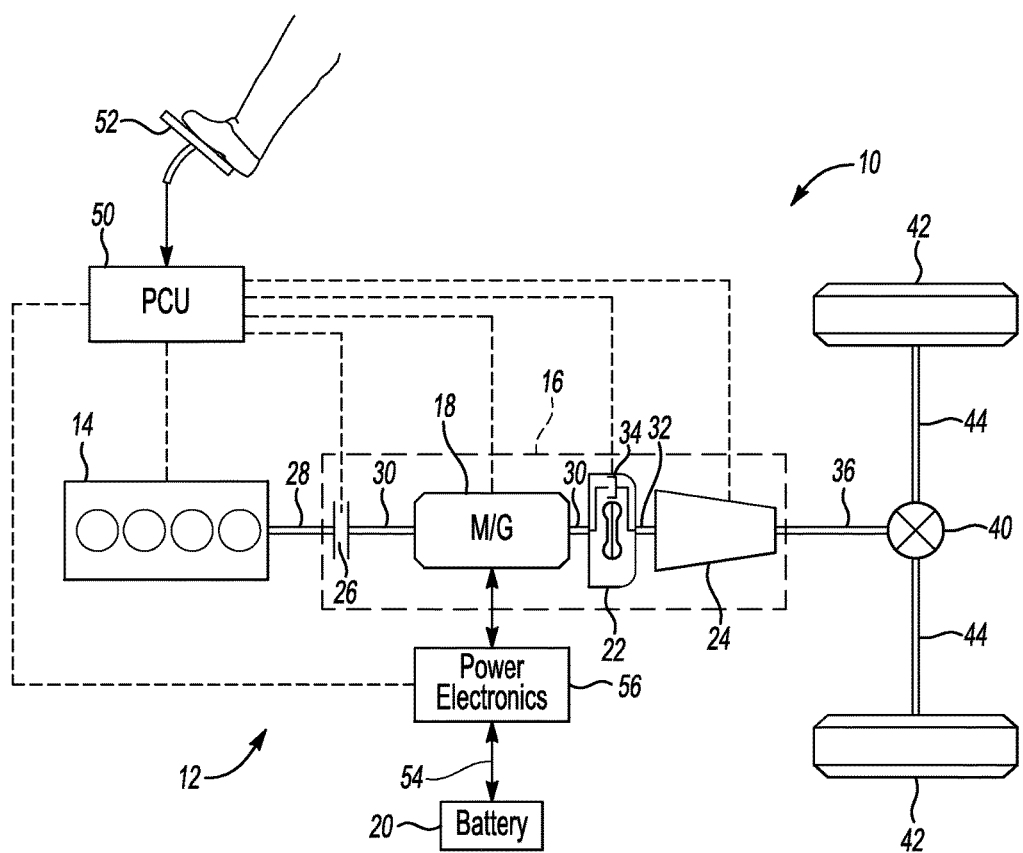
FIG. 1 is a schematic diagram of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The engine may be started using several methods including, but not limited to, a starter motor 15 that engages the flywheel to rotate the engine for starting. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, selecting or scheduling transmission shifts, etc.

Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 48. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
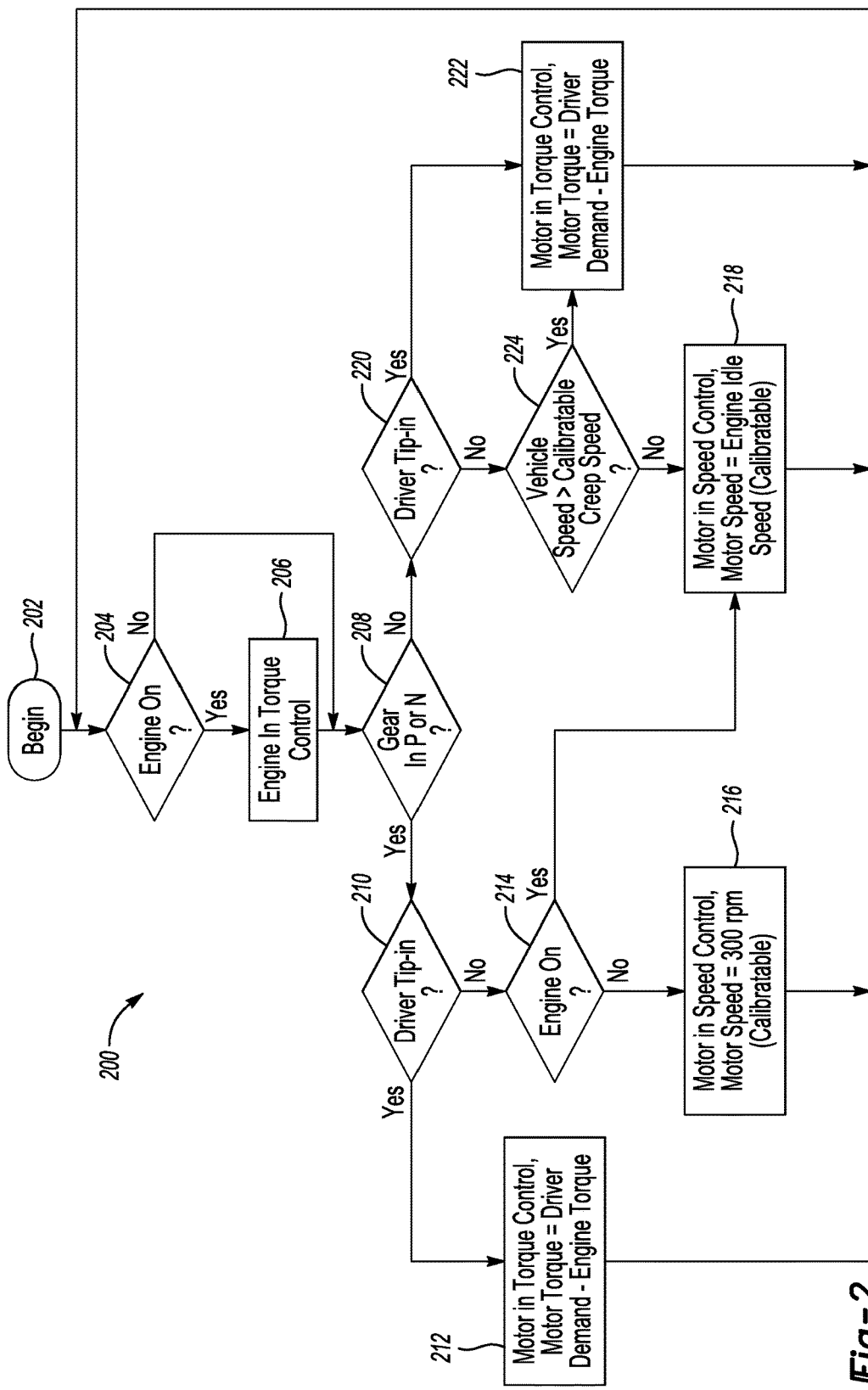
FIG. 2 is a flow chart of an algorithm for simulating vehicle creep and idle control in a hybrid vehicle.

FIG. 2 is a flow chart of an algorithm for determining a vehicle creep and idle control method for a hybrid vehicle. The method is implemented using software code contained within the vehicle control module, according to one or more embodiments. In other embodiments, the method 200 is implemented in other vehicle controllers, or distributed amongst multiple vehicle controllers.

The method of controlling creep and idle in the hybrid electric vehicle may be implemented through a computer algorithm, machine executable code, or software instructions programmed into a suitable programmable logic device(s) of the vehicle, such as the vehicle control module, the hybrid control module, other controller in communication with vehicle computing system, or a combination thereof. Although the various steps shown in the flowchart diagram 200 appear to occur in a chronological sequence, at least some of the steps may occur in a different order, and some steps may be performed concurrently or not at all.

At step 202, the vehicle computing system may receive one or more signals that enable the algorithm to begin processing the creep control function in a hybrid powertrain system. For example, the one or more signals may include an ignition-on and/or power-on request made by a vehicle occupant. During the power-on of the vehicle computing system, the hybrid powertrain may continuously monitor to determine if the internal combustible engine is on or being requested to start. The hybrid powertrain may monitor when the engine is on or off to determine the proper control mode for the system at step 204.

At step 206, if the engine is on, the hybrid powertrain system may command the engine to be in torque control mode. The torque control mode of the engine allows the hybrid powertrain system to command additional torque from the engine. An example of the powertrain requesting additional torque from the engine may be to provide torque to the wheels or used to generate power for charging the battery system. The engine may produce torque to charge the battery while allowing the engine speed to be regulated by the electric machine.

At 208, the hybrid powertrain system may determine if the system is in a park or neutral state. If the system is in park or neutral, the hybrid powertrain system may be in an idle control function by placing the electric machine in speed control mode. The system may monitor the accelerator pedal to determine if the driver has tipped-in the accelerator pedal when the vehicle is in park or neutral at step 210. If the driver has requested power from the hybrid powertrain system using the accelerator pedal in park/neutral, the electric motor may be placed in a torque control mode requiring the system to drive towards a target torque, therefore motor toque may be calculated to be the sum of driver demand minus engine torque at step 212. For example, if the system detects that the engine is off, the hybrid powertrain system is in park/neutral, and the driver has tipped-in the accelerator pedal, then the system may calculate motor torque equal to driver demand since engine torque is zero.

At step 214, if the hybrid powertrain system is in park/neutral and the driver has not tipped-in the accelerator pedal, the system may determine a calibratable motor speed control value based on whether the engine is on or off. If the powertrain system is in park/neutral, internal combustible engine is off, and the system identifies that a foot-off accelerator pedal condition exists, the system may command an idle function by requesting the electric machine speed to be in speed control and calibrated to a value lower than an engine idle condition (e.g. calibrate the electric machine to 300 RPM) at step 216. In another example, the electric machine is calibrated to a minimum allowable vehicle idle speed (e.g. zero RPM). In this case, an electric oil pump is switched on to provide hydraulic pressure to the transmission. If the powertrain system is in park/neutral, internal combustible engine is on, and the driver has not tipped-in the accelerator pedal, the system may command the electric machine to be in speed control and calibrated to a value equal to engine idle (e.g. calibrate the electric machine to 600 RPM) at step 218.

At step 208, the hybrid powertrain system may determine if the system is in a park or neutral state. If the system is in forward or reverse gear (not in park/neutral), the hybrid powertrain system may determine whether or not to place the powertrain control in torque control or speed control based on whether the driver has tipped-in the accelerator pedal at step 220. The system may monitor the accelerator pedal to determine if the driver has tipped-in the pedal when the vehicle is not in park/neutral.

At step 222, if the driver has tipped-in the accelerator pedal while the hybrid system is in forward or reverse gear, the electric motor may be placed in a torque control mode, therefore motor toque may be calculated to be the sum of driver demand minus engine torque. For example, the driver has requested power and/or vehicle acceleration using the accelerator pedal, the electric machine is placed in the torque control mode while the engine remains in torque control mode if it is commanded on by the system. The initial electric machine torque command is the last commanded torque in speed control mode. The last commanded torque in speed control may be stored and retrieved by the system in one or more control modules including, but not limited to, the electric machine speed controller. The torque command then gradually transitions to the driver requested torque from the accelerator pedal position. The vehicle transitions out of creep control as the system gradually calculates driver requested torque from the accelerator pedal input.

In another example during a drive event, if the driver tips-out of the accelerator pedal, the vehicle and/or powertrain system may start to coast down. If the driver applies the brake, the vehicle may slow down faster. In either case, if the vehicle slows down to a calibratable creep speed (e.g. 5 MPH), the electric machine may be controlled in the speed control mode, and the speed set point may be calibrated to the engine idle speed. The vehicle may begin to transition into creep control mode as the vehicle slows down to a calibratable creep control speed value.

At step 224, if the hybrid powertrain system is in forward/reverse gear and the driver has not tipped-in the accelerator pedal, the system may calculate if vehicle speed is greater than a maximum allowable vehicle creep speed before determining whether to control the hybrid powertrain system in speed control or torque control. If the vehicle speed is greater than a calibratable creep speed, then the system may control the hybrid powertrain system in a torque control mode, therefore motor toque may be calculated to be the sum of driver demand minus engine torque. If the vehicle speed is less than a calibratable creep speed, then the hybrid powertrain system may be in a speed control and the electric machine speed may equal to a calibratable engine idle speed at step 218.

Figure 3:
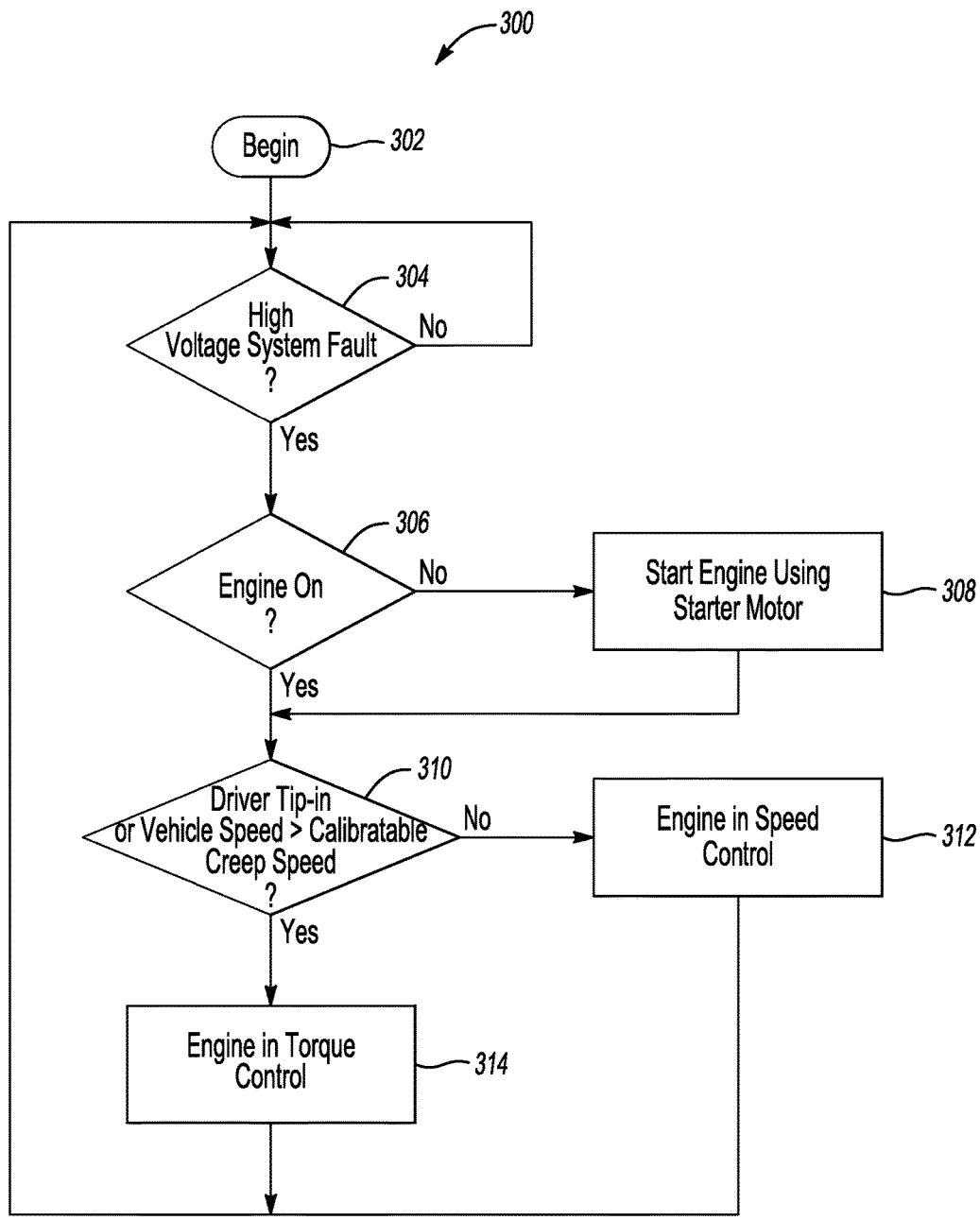
FIG. 3 is a flow chart of an algorithm for a vehicle creep remedial control action strategy.

FIG. 3 is a flow chart of an algorithm for determining a vehicle creep control remedial action strategy when a system fault is detected for a hybrid vehicle. The hybrid powertrain system may determine based on one or more factors whether or not to control the engine and/or electric machine using a torque control strategy or a speed control strategy. There may be several scenarios that may cause the hybrid powertrain system to set the engine and/or electric machine into a speed control or torque control mode including, but not limited to, high voltage system faults, battery state of charge, and/or vehicle speed.

At step 302, the vehicle computing system may detect if a high voltage system fault is set in one or more powertrain components including, but not limited to, the electric machine, the electric machine drive, and/or the battery. The system monitoring a high voltage system fault may determine whether to control the hybrid powertrain system in speed or torque control mode during vehicle creep. If the computing system detects a high voltage system fault, it may request information to determine whether the engine is on or off at step 306.

If the computing system detects that the engine is off, it may command the engine to be started at step 308. The engine may be started using several methods including, but not limited to, a starter motor. Once the engine is started, the hybrid powertrain system may monitor if a driver has requested torque and/or vehicle acceleration using cruise control inputs or the accelerator pedal, or if vehicle speed is greater than a calibratable creep speed when determining whether to control the vehicle creep using speed control or torque control at step 310. If the driver does not tip-in the accelerator pedal and the vehicle speed is less than a calibratable creep speed, then the hybrid powertrain system may control the engine in speed control at step 312. If the driver does tip-in the accelerator pedal or the vehicle speed is greater than a calibratable creep speed, the hybrid powertrain system may control the engine in torque control at step 314.

One or more faults may be detected by the hybrid powertrain system such that the creep control mode strategy may enter into a remedial action requiring the engine to start or remain on. The creep control mode strategy, including the remedial action creep control strategy, may be implemented on several hybrid powertrain configurations such as a modular hybrid transmission system, a parallel hybrid system, a start-stop mild hybrid system, and a series hybrid system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine including a crankshaft;
   a transmission having an input;
   a torque converter mechanically coupled to the input;
   an electric machine mechanically coupled to the torque converter;
   a clutch configured to mechanically couple the electric machine and crankshaft; and
   one or more controllers programmed to, in response to the transmission being in a drive or reverse gear and a speed of the vehicle being less than a predetermined value in an absence of driver demand, control the electric machine to achieve a target speed to cause the torque converter to output torque such that the speed of the vehicle approaches a generally constant speed less than or equal to the predetermined value when the vehicle is on generally flat grade.

2. The vehicle of claim 1 wherein the predetermined value is a maximum allowable vehicle creep speed.

3. The vehicle of claim 1 wherein the target speed is approximately equal to an idle speed of the engine.

4. The vehicle of claim 1 wherein the absence of driver demand is defined by a foot-off accelerator pedal condition.

5. The vehicle of claim 1 wherein the one or more controllers are further programmed to control the engine to output a target torque when the engine is on.

6. A method for controlling a vehicle comprising:
   in response to a transmission being in a drive gear and vehicle speed being less than a predetermined value in an absence of driver demand, controlling an electric machine to achieve a target speed to cause a torque converter to output torque such that the vehicle speed approaches a generally constant value less than or equal to the predetermined value when the vehicle is on generally flat grade.

7. The method of claim 6 wherein the predetermined value is a maximum allowable vehicle creep speed.

8. The method of claim 6 wherein the target speed is approximately equal to an engine idle speed.

9. The method of claim 6 further comprising controlling an engine to output a target torque when the engine is on.

10. A hybrid vehicle comprising:
    an engine including a crankshaft;
    a transmission including an oil pump and having an input;
    a torque converter mechanically coupled to the input;
    an electric machine mechanically coupled to the torque converter;
    a clutch configured to mechanically couple the electric machine and crankshaft; and
    one or more controllers programmed to, in response to the transmission being in a neutral or park gear and the engine being off, control the electric machine to achieve a target speed less than engine idle or equal to a predetermined value in an absence of driver demand to output torque to the oil pump for control of oil pressure in the transmission.

11. The hybrid vehicle of claim 10 wherein the predetermined value is a minimum allowable vehicle idle speed.

12. The hybrid vehicle of claim 10 wherein the target speed is less than an idle speed of the engine.

* * * * *